(12) United States Patent
Hoyne

(10) Patent No.: US 6,227,608 B1
(45) Date of Patent: *May 8, 2001

(54) WAGON

(76) Inventor: Anthony Peter Hoyne, Grennan Garden House, The Mall, Thomastown, County Kilkenny (IE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,932

(22) Filed: Sep. 19, 1997

(30) Foreign Application Priority Data

Sep. 19, 1996 (IE) .................................................... 5960659
Dec. 19, 1996 (IE) .................................................... 960907

(51) Int. Cl.[7] ...................................................... B60P 1/04
(52) U.S. Cl. ........................... 296/184; 296/56; 296/100.1; 298/23 C
(58) Field of Search .................. 296/184, 56, 146.1, 296/146.4, 146.8, 100.1; 298/23 C, 23 S, 23 A

(56) References Cited

U.S. PATENT DOCUMENTS

| 3,762,762 | 10/1973 | Beveridge et al. | 296/137 |
| 3,861,737 | 1/1975 | Kirkbride | 296/100 |
| 3,913,969 | 10/1975 | Hoch | 296/100 |
| 4,083,596 | 4/1978 | Robertson | 296/100 |
| 4,200,330 * | 4/1980 | Scott | 296/100.1 |
| 5,190,341 | 3/1993 | Simard . | |
| 5,322,336 | 6/1994 | Isler | 296/100 |
| 5,542,734 | 8/1996 | Burchett et al. . | |

FOREIGN PATENT DOCUMENTS

| 0123483 | 10/1984 | (EP) . | |
| 0700802 | 3/1996 | (EP) . | |
| 2721870 | 1/1996 | (FR) . | |
| 2233938 | 1/1991 | (GB) . | |
| 1133-139 * | 1/1985 | (SU) | 296/184 |

* cited by examiner

Primary Examiner—D. Glenn Dayoan
Assistant Examiner—Jason Morrow
(74) Attorney, Agent, or Firm—Jacobson, Price, Holman & Stern, PLLC

(57) ABSTRACT

A wagon has a chassis mounted on wheels. A box-shaped material container body is mounted on the chassis. A cover is hingedly mounted on the container body and is movable by rams between an open position for filling the container body and a closed sealed position on the container body for transport. A rear discharge door is clamped shut by a door locking clamp and by a ram-operated retractable locking beam which is engageable with a lower end of the discharge door.

17 Claims, 9 Drawing Sheets

WAGON

BACKGROUND OF THE INVENTION

The invention relates to trailers, wagons and the like for the transport of goods and materials.

The invention particularly relates to the transport of bulk materials such as mineral concentrates. Open topped trailers are commonly used for the transport of such material. However, in the event of a collision, such materials can be spread over a wide area causing environmental hazards. Also, during transport, rain or spray from the road can adversely affect the goods being carried in the trailer. Also dust rising from the material being carried may undesirably pollute the atmosphere during transport.

The present invention is directed towards overcoming these problems.

BRIEF DESCRIPTION OF THE INVENTION

According to the invention there is provided a wagon comprising a body having a base and upstanding side walls around the base forming with the base an open-topped container for reception of material to be carried in the wagon, a material filling opening being defined by upper ends of the side walls a rigid cover mounted on the side walls, the cover being movable between a closed position across the filling opening and an open position for filling the container body, and sealing means engagable between the cover and the side walls when the cover is in a closed position to seal an interior of the body.

In one embodiment of the invention the body is pivotally mounted on a support chassis, means is provided for tipping the body on the support chassis, a discharge door is provided in the side walls of the body for discharging material from the body when the body is tipped on the chassis, the discharge door being pivotally mounted at its upper end on the body such that a lower end of the discharge door is movable outwardly of the body for discharging material from the body, and a door locking clamp which is releasably engagable with an outer face of the discharge door to releasably secure the discharge door in a closed position.

In another embodiment the door locking clamp comprises a ram-operated beam mounted on the wagon adjacent the discharge door, the beam being movable between an engaged position extending across a lower end of the discharge door and a released position away from the discharge door allowing opening of the discharge door.

Preferably, a discharge door seal is provided for sealing engagement between the discharge door and a door-receiving opening in the body when the discharge door is in the closed position.

In another embodiment the cover is hingedly mounted on a side wall of the body and a sealing flap is provided along a free edge of the cover, the sealing flap, sealingly engageable with an outer face of the opposite side wall when the cover is a closed position.

In a further embodiment the cover locking means is provided for releasably locking the cover In the closed position, the locking means being of two part construction comprising a locking bolt and a complementary receiver, one part being mounted on the cover and the other part being mounted on a side wall of the body.

Preferably the bolt is ram-operated for movement between an extended receiver-engaging locking position and a retracted released position.

In another embodiment the cover is operable by ram means for movement between the closed position and the open position.

Preferably, the ram means is mounted within the body on the side wall on which the cover is hingedly mounted, the ram means extending between an underside of the cover and an inside face of the side wall. Conveniently, the cover is pivotable through an angle of greater than 90° when moving between the closed position and the open position.

In another embodiment the container has tapered sides which taper inwardly between a front end and a rear end of the body at which the discharge door is mounted.

In a preferred embodiment the locking means is of two part construction, comprising a bolt and an associated receiver, one part being on the cover and the other part being on the side wall. Preferably, the bolt is ram operated for movement between an engaged and a released position.

Ideally, also mechanical locking means is provided for further securing the cover in the closed position. For example mechanical screw locks may be provided for engagement between the side walls and the cover.

In a particularly preferred embodiment a seal is engaged between the cover and the side walls when the cover is closed. Thus advantageously the ingress of moisture is prevented and also escape of materials from the container body is prevented. The seal may be mounted on one or both of the cover and side walls.

In another embodiment a rear side wall is formed by a rear discharge door pivotally mounted at a rear end of the container body, having associated locking means to retain the door in a closed position. Preferably, the door is hinged at its upper end to facilitate tipping the container body on a chassis of the trailer to discharge material from the container body.

In a further embodiment the locking means is a ram operated beam mounted at a rear end of the trailer and being moveable between an engaged position across the rear lower end of the door and a released position.

In a particularly preferred embodiment a seal is provided for sealing between the door and a rear end of the container body when the door is closed.

Preferably the container has tapered sides which taper inwardly between a front end and a rear end of the container.

It will be noted that the term wagon as used in this patent specification includes trailers with a container body or vehicles with a container body fixed on the chassis of the vehicle.

DESCRIPTION OF THE DRAWINGS

The invention will be more clearly understood from the following description of an embodiment thereof, given by way of example only with reference to the accompanying drawings in which.

DESCRIPTION OF PREFERRED EMBODIMENTS

Figure 1:
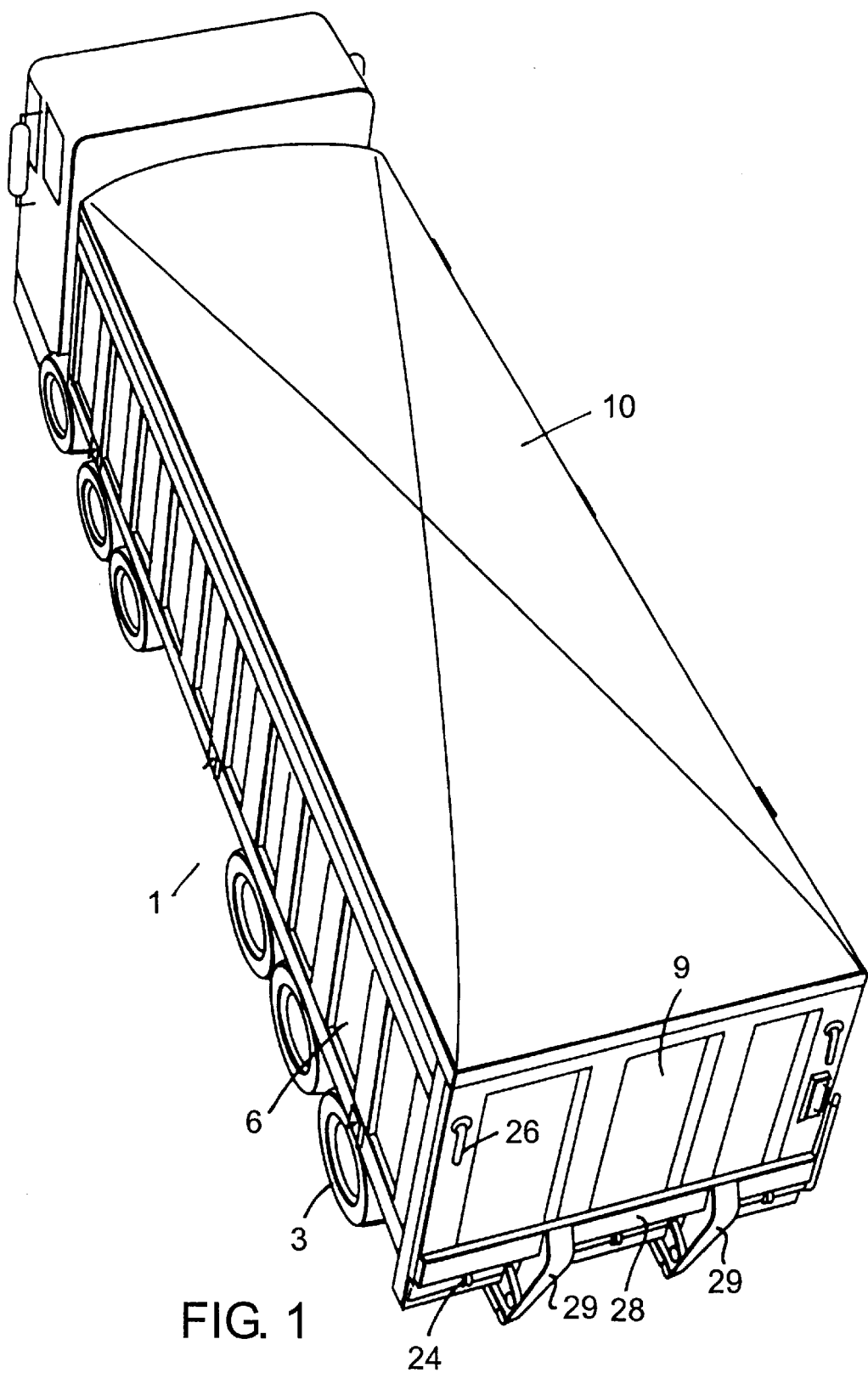
FIG. 1 is a perspective view of a trailer according to the invention shown attached to a tractor vehicle.
Figure 2:
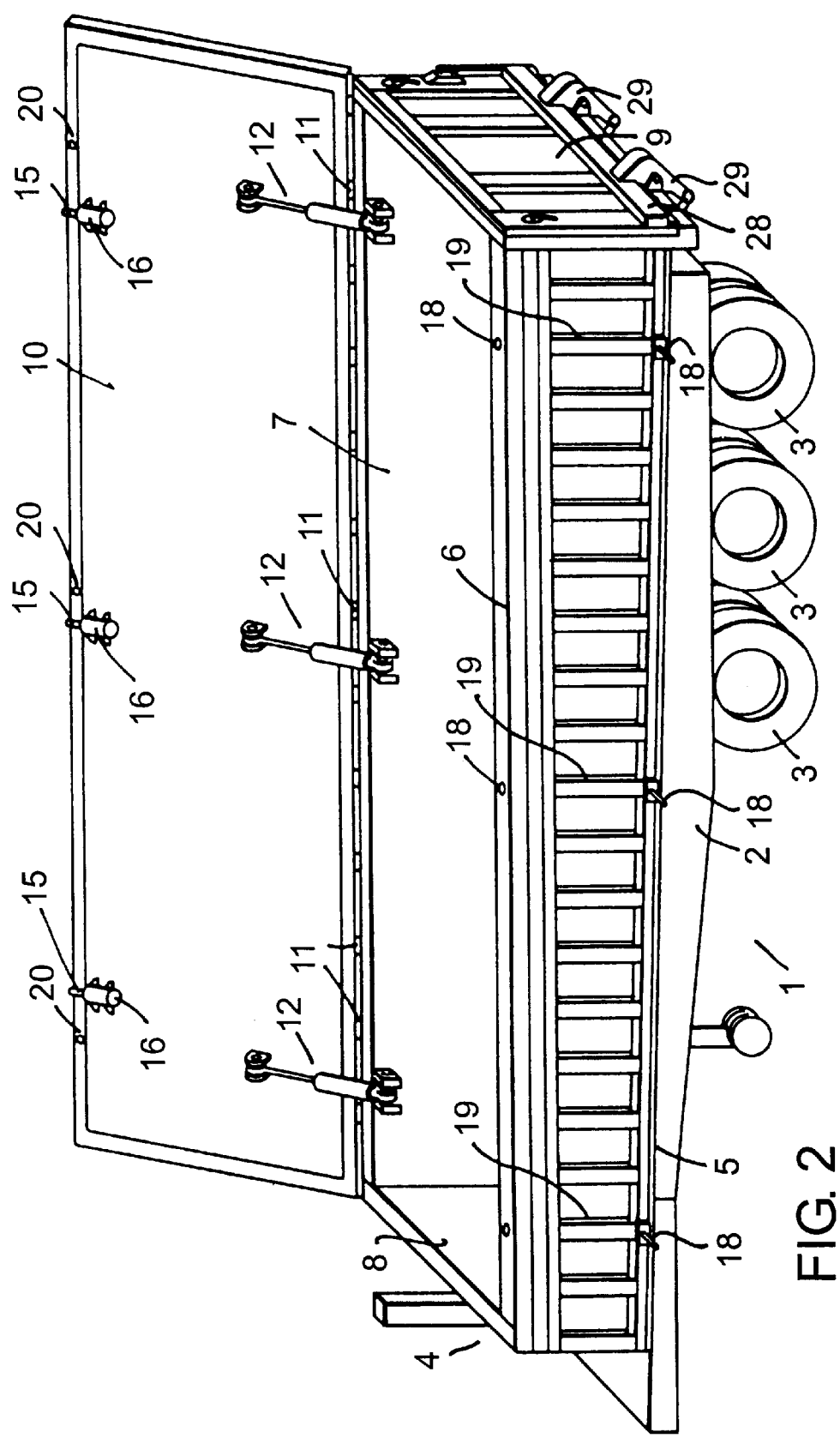
FIG. 2 is a perspective view of the trailer, with a cover of the trailer shown in an open position.
Figure 3:
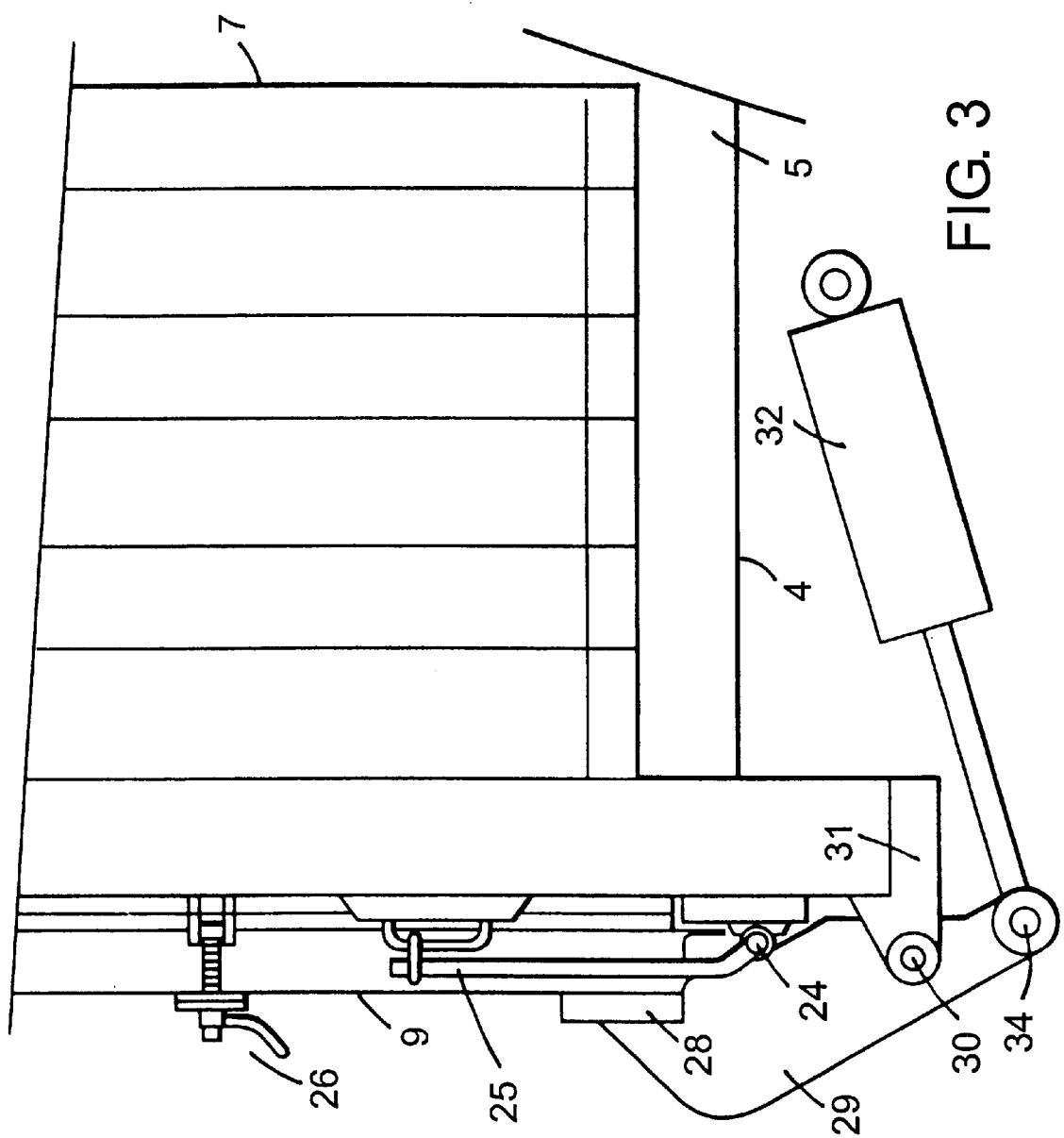
FIG. 3 is a detail side elevation view showing portion of a rear end of the trailer.
Figure 4:
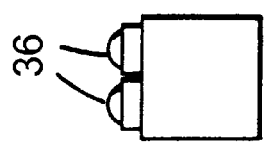
FIG. 4 is a detail view of a seal for a rear door of the trailer.

Referring to the drawings, and initially to FIGS. 1 to 5 thereof, there is shown a wagon according to the invention indicated generally by the reference numeral 1. The wagon 1 has a chassis 2 mounted on wheels 3. A box-shaped material container body 4 is mounted on the chassis 2 and comprises a base 5 with upstanding side walls comprising sides 6,7, a front wall 8 and a rear discharge door 9 which is hingedly mounted at its upper ends between the sides 6,7. A cover 10 is hingedly mounted on one side 7 for movement between an open position as shown in FIG. 2 and a closed position as shown in FIG. 1.

The cover 10 is mounted on the side wall 7 by hinges 11. Rams 12 are mounted between the side wall 7 and the cover 10 and are operable to pivot the cover 10 on the side wall 7 for opening and closing the cover 10. Each ram 12 is connected to an hydraulic power supply for operation of the rams 12.

Locking means is provided for locking the cover 10 in the closed position. In this case the locking means comprises locking bolts 15, carried by rams 16 which are mounted on an underside of the cover 10. The rams 16 are operable to extend the bolts 15 for engagement with associated receiver sockets (not shown) adjacent an upper end of the side wall 6 for securely locking the cover 10 in the closed position.

Additionally, further locking means is provided in the form of manually operated screw locks 18 which extend through hollow pillars 19 in the side wall 6 for engagement with associated receiver slots 20 in the cover 10.

A resilient seal is engageable between the cover 10 and the side walls 6,7,8,9. The seal may be mounted along an upper edge of the side walls 6,7,8,9 and/or around a peripheral edge of an inside face of the cover 10. Advantageously the seal prevents ingress of water and moisture which could adversely affect a cargo and also prevent the escape of dust from an interior of the container during transport of material in the container.

The rear discharge door 9 is hinged at its upper end to the sides 6,7 of the container body 4. A five point door locking clamp 24 is mounted at the bottom of the door 9 having an associated actuating lever 25. Also, a manual twist lock clamp 26 is mounted on each side of the door 9. For added security a locking beam 28 is engagable with a lower end of the door 9 to securely retain the door 9 in the closed position. The beam 28 is carried on a pair of pivoting support arms 29. Each support arm 29 is mounted by a pivot pin 30 on a mounting bracket 31 at a rear end of the container body 4. A ram 32 is mounted between a pivot link 34 on the arm 29 and the container body 4 or wagon chassis 2. The ram 32 is operable to engage and release the beam 28, the beam 28 being retracted for opening the door 9.

A twin ruberoid seal 36 (FIG. 4) engages between the door 9 and each side 6,7 and the base 5 of the container body 4 to prevent escape of material from the container body 4 and ingress of moisture into the body 4 during transport.

Each of the sides 6,7 tapers inwardly between a front end and a rear end of the container body 4, effectively forming a funnel to assist in the discharge of material when the container body 4 is tipped on the chassis 2.

Figure 5:
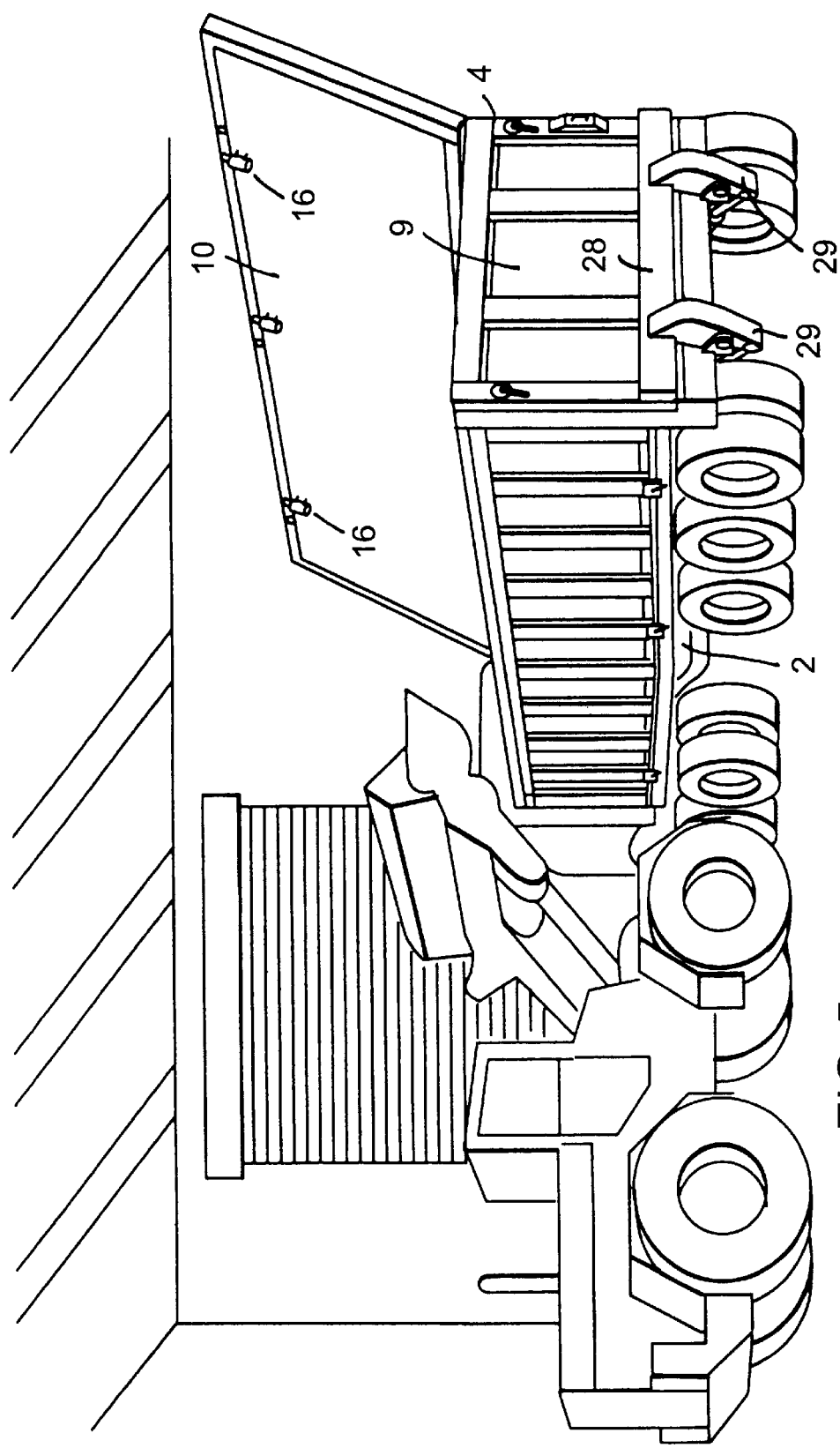
FIG. 5 is a perspective view showing the trailer in use.

In use, to load the wagon 1 the cover is opened as shown in FIGS. 2 and 5 and material is dropped into the container body 4. The cover 10 is then closed and locked sealing the material within the container body 4. During transport, escape of dust from within the container body 4 and ingress of moisture into the container body 4 is prevented by the seals. In the event of accidents or collisions, the locking means for the cover 10 and rear discharge door 9 keep the materials securely sealed within the container body 4. To discharge material from the container body 4 the door locking clamp 24, manual twist lock clamps 26 and the locking beam 28 are released and upon tipping the container body 4 on the chassis 2 material is discharged through a rear end of the container body 4. It will be noted that the tapered sides 6,7 promote the full discharge of material once the material begins to flow from the container body 4.

It would be noted that a downwardly and outwardly sloping lip is provided at a rear end of the base 5 to ensure positive engagement of the seal at a lower end of the door. Sides of the opening in which the door is mounted may also be tapered for this purpose if desired.

Advantageously, the invention provides a wagon for the sealed transportation of material, in particular bulk particulate materials for example mineral concentrate materials, and granular materials and all milled and ground substances. The sealing arrangements ensure that in the event of collision or turn-over loss of material from the container body is prevented.

Advantageously also material is provided from being wind blown or being bounced out of the wagon and also water is prevented from collecting within the container which would increase the weight being carried by the wagon.

Figure 6:
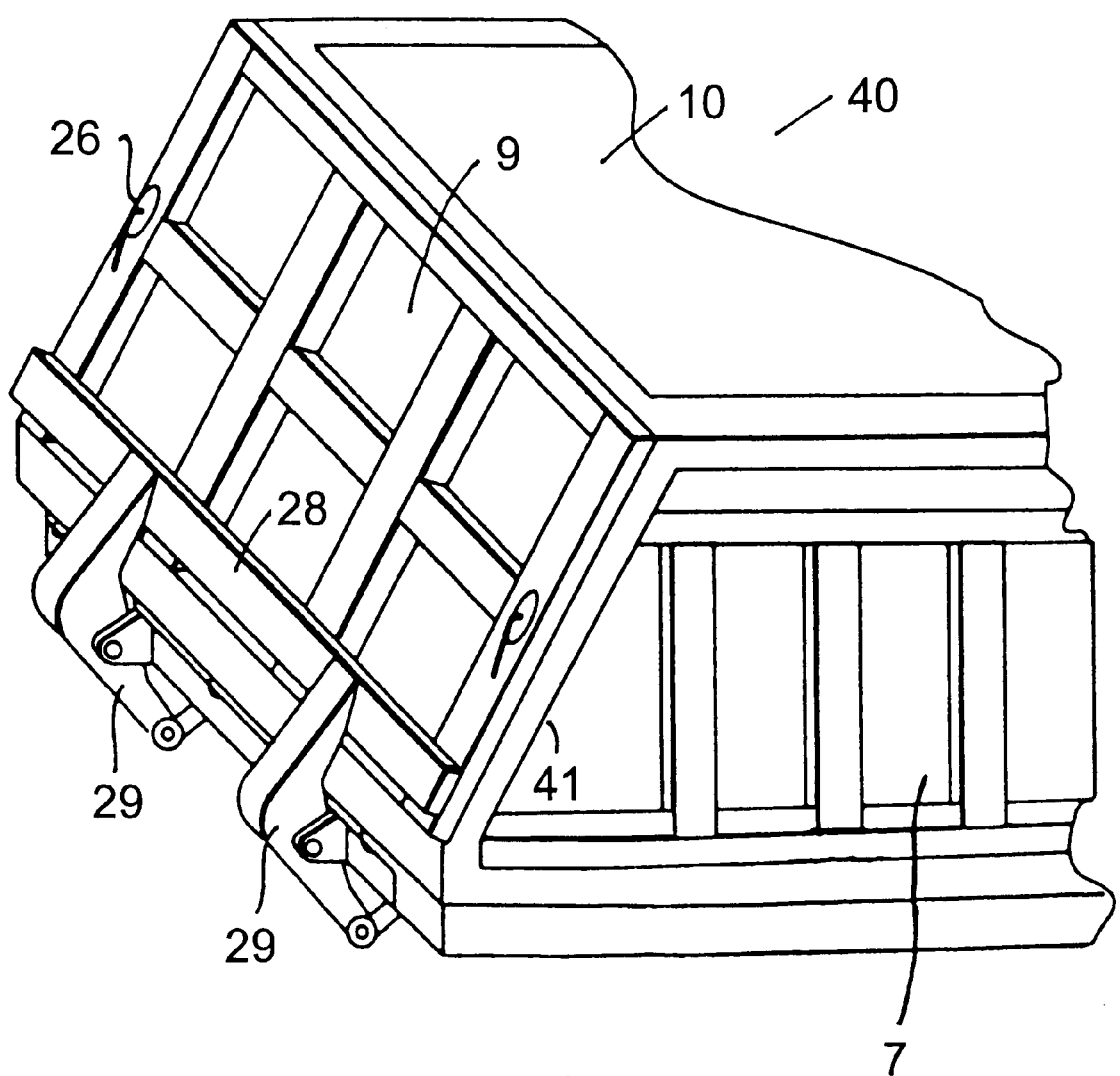
FIG. 6 is a detailed perspective view of a rear end of another wagon.

Referring now to FIG. 6 there is shown a rear end of another wagon 40 in which parts similar to those described previously are assigned the same reference numerals. In this case the rear discharge door 9 is supported in an inclined position when closed, the door 9 engaging against an inclined rear post 41 of the side walls 6, 7.

Figure 7:
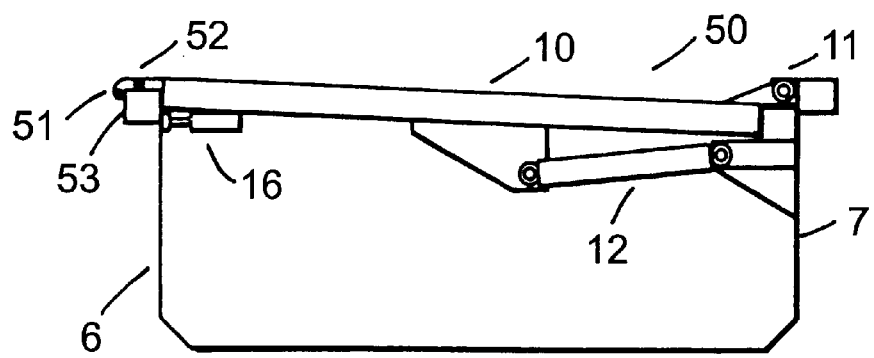
FIG. 7 is a schematic sectional elevation view of another wagon.

Referring now to FIG. 7 there is shown schematically a section through another wagon 50. Parts similar to those described previously are assigned the same reference numerals. In this case a sealing flap 51 is provided along a free edge 52 of the cover 10. The sealing flap 51 is sealingly engagable with an outer face 53 of the side wall 6 opposite the hinge mount 11 when the cover 10 is in the closed position as shown in FIG. 7. The seal way be provided by making the flap 51 resilient for deflecting to engage the side wall 6 as the cover 10 is lowered. Alternatively, a resilient sealing strip may be provided on the flap 51 or the side wall 53.

Figure 8:
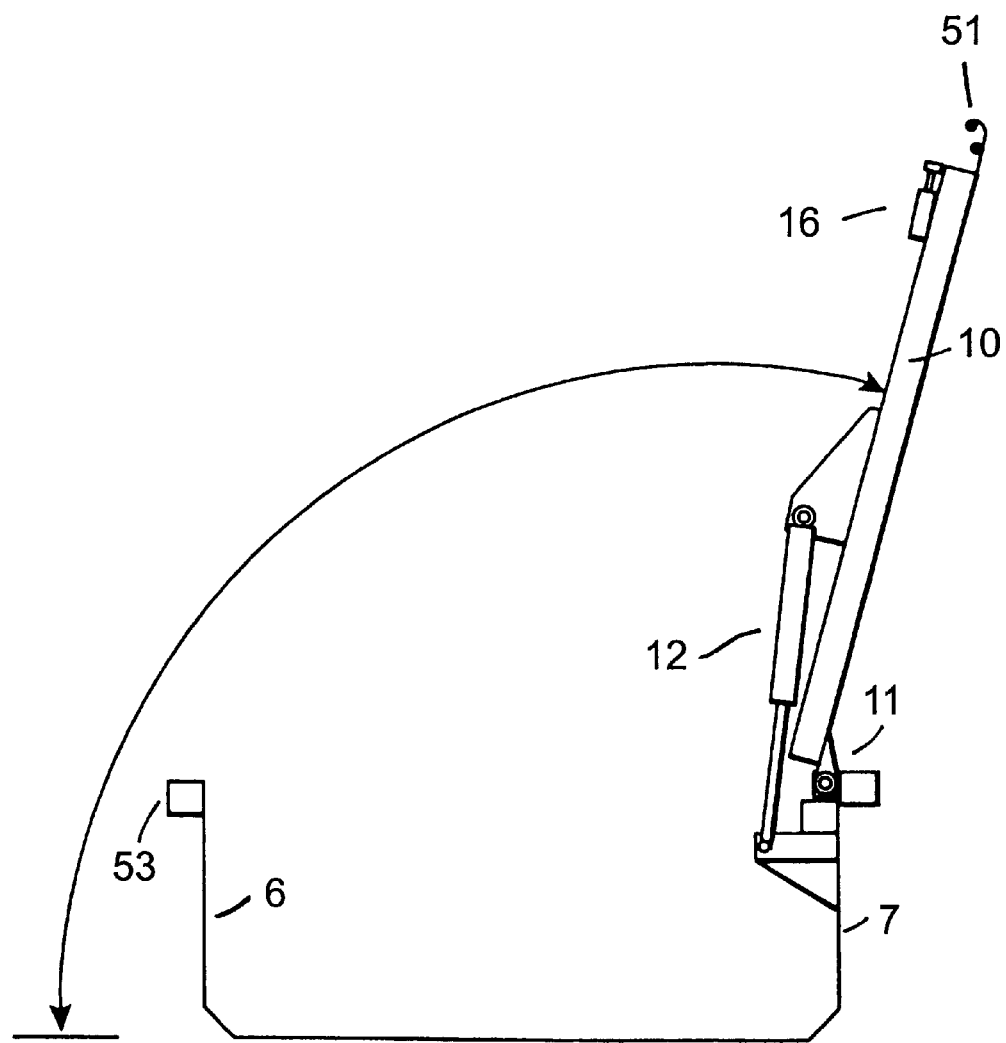
FIG. 8 is a view similar to FIG. 7 showing a cover of the wagon in an open position.

FIG. 8 shows the cover 10 of the wagon 50 in an open position. It will be noted that the cover 10 swings through greater than 90°, in this case approximately 103° to fold the cover 10 out of the way for loading.

Figure 9:
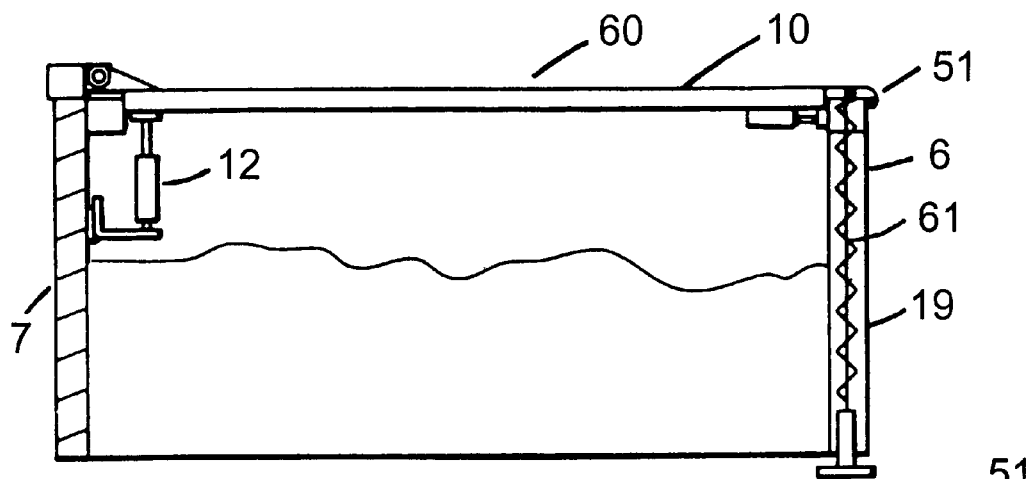
FIG. 9 is a sectional elevational view of another wagon.

FIG. 9 is a sectional view through another wagon 60. This shows a mechanical screw 61 mounted within pillars 19 for manually locking the cover 10 in the closed position.

Figure 10:
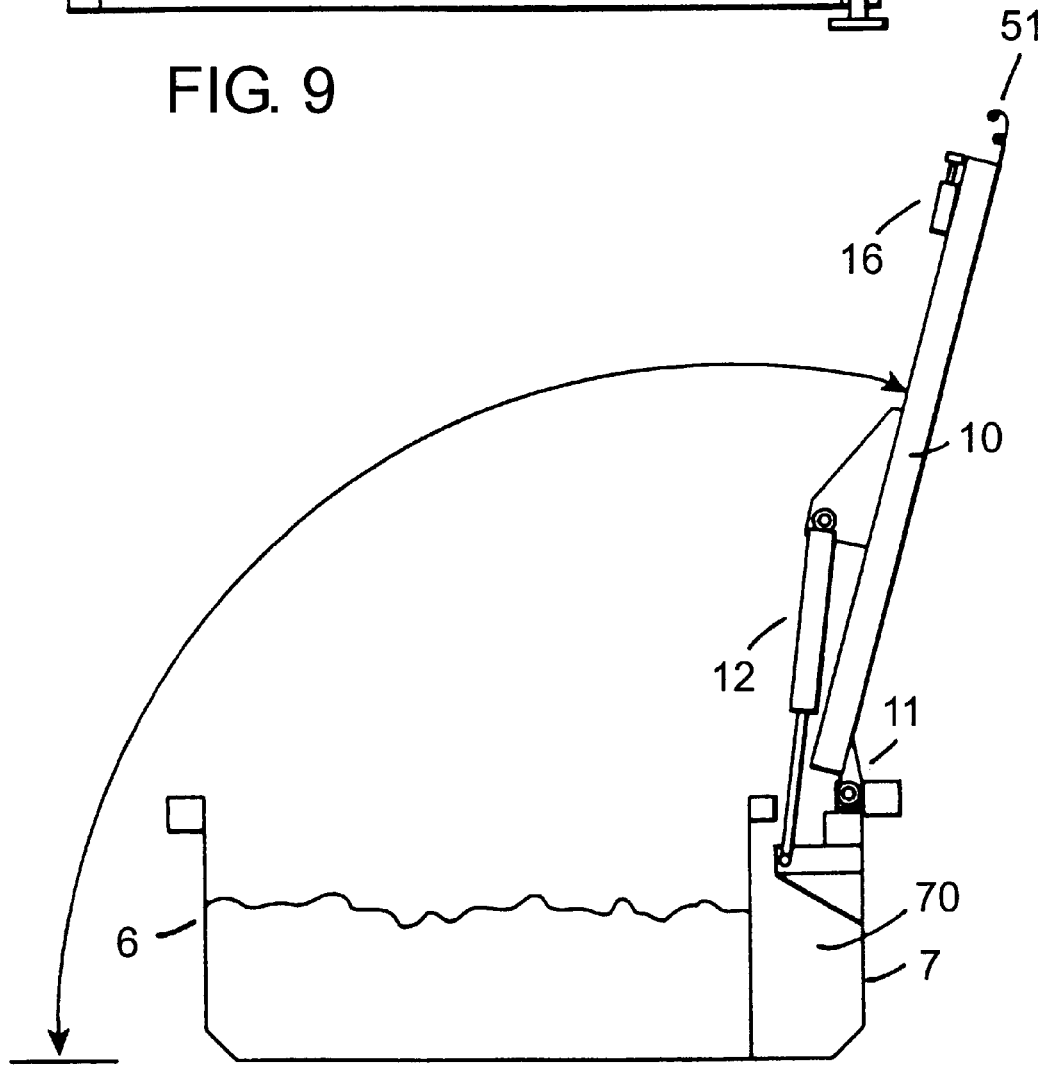
FIG. 10 is a view similar to FIG. 8 of another wagon.

FIG. 10 is a view similar to FIG. 8. In this case the cover operating rams 12 and hinges 11 are mounted in a separate bulkhead 70 at one side of the body of the wagon. This may be desirable if particularly corrosive materials are being carried in the wagon.

Figure 11:
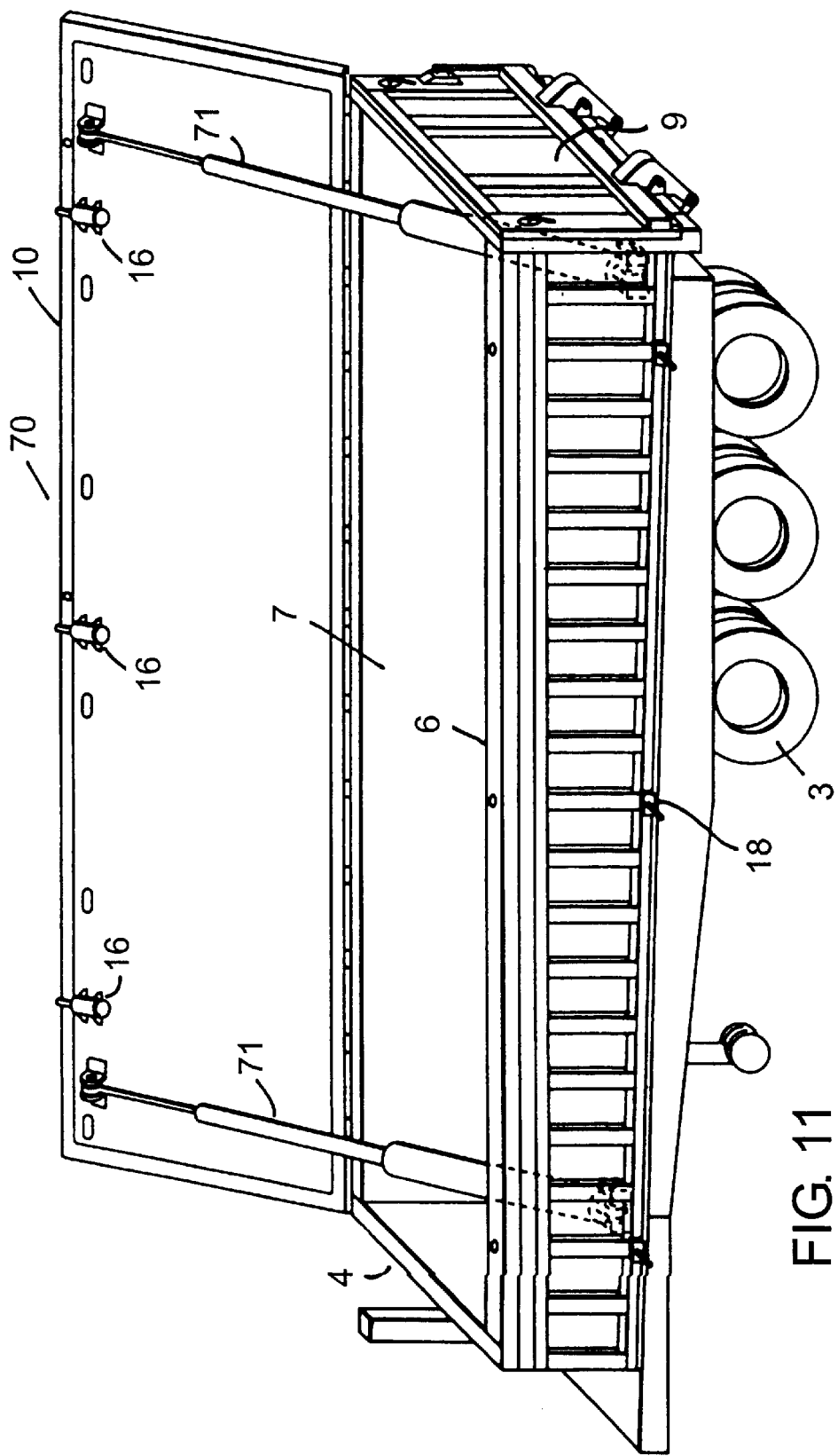
FIG. 11 is a perspective view similar to FIG. 2 of another wagon.

Referring now to FIG. 11 there is shown another wagon 70 which is largely similar to the wagons previously described and like parts are assigned the same reference numerals. In this case a pair of cover opening rams 71 are mounted at each end of the body 4 extending between a floor of the body 4 and a free edge of the cover 10.

Figure 12:
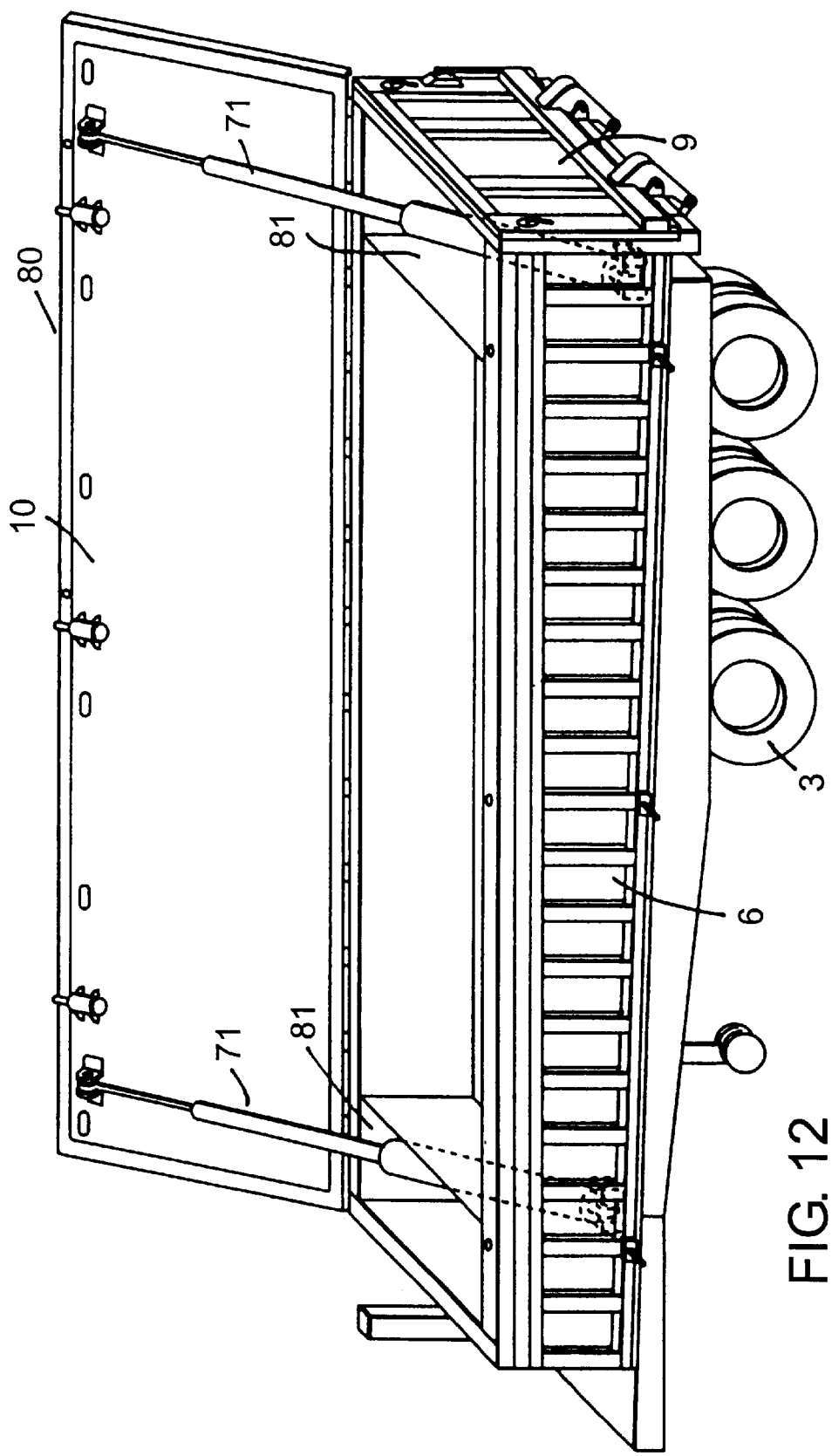
FIG. 12 is a perspective view similar to FIG. 2 of a further wagon.

Referring now to FIG. 12 there is shown another wagon 80 which is largely similar to the wagon of FIG. 11. In this case the rams 71 are each mounted in separate bulkheads 81 at a front and at a rear end of the body 4.

It will be appreciated that alarm means may be provided to prevent a driver driving away the wagon when the cover 10 is in an open position.

It will also be appreciated that the discharge door may in some cases be provided on the side of the wagon, the wagon being arranged for tipping to one side to discharge material from the wagon.

It will be appreciated that various other cover arrangements may be provided within the scope of the invention.

The invention provides a wagon or the like in which materials such as mineral concentrates, sludge residue, waste materials and other environmentally hazardous materials can be transported safely, the material being sealed within the wagon during transport. Noxious fumes and unpleasant odours are retained within the wagon which is particularly advantageous where the wagon travels through populated areas.

Conveniently a protective coating or lining may be provided covering at least portion of an interior surface of the body. Preferably the lining comprises a plastics material which provides corrosion and chemical resistance and which has a smooth low-friction surface for facilitating flow of material being discharged from the body. Particularly suitable lining materials comprise advanced polymer coatings "IPI-SUPERBARRIER" and "IPI-VESSEL LINING" manufactured by the US company. Integrated Polymer Industries, Inc. One or both of these coatings may be used to cover the interior surface of the body.

The invention is not limited to the embodiment hereinbefore described which may be varied in both construction and detail.

What is claimed is:

1. A wagon comprising:

a body having a base and upstanding side walls around the base forming with the base an open-topped container for reception of material to be carried in the wagon, a material filling opening being defined by upper ends of the side walls, a rigid cover mounted on the side walls, the cover being movable between a closed position across the filling opening and an open position for filling the container body, the cover being hingedly mounted at one side of the body, ram means mounted between the cover and the body for movement of the cover between the open position and the closed position, locking means for releasably locking the cover in the closed position, sealing means engageable between the cover and the side walls when the cover is in the closed position to seal an interior of the body, the body being pivotally mounted on a support chassis, means for tipping the body on the support chassis, a discharge door being provided in a side wall of the body for discharging material from the body when the body is tipped on the chassis, the discharge door being pivotally mounted at its upper end on the body such that a lower end of the discharge door is movable outwardly of the body discharging material from the body, discharge door locking means for locking the discharge door in a closed position, a discharge door seal being provided for sealing engagement between the discharge door and a door receiving opening in the body when the discharge door is in the closed position, and a door locking clamp being releasably engageable with an outer face of the discharge door to releasably secure the discharge door in a closed position.

2. A wagon as claimed in claim 1 wherein the door locking clamp comprises a ram-operated beam mounted on the wagon adjacent the discharge door, the beam being movable between an engaged position extending across a lower end of the discharge door and a released position away from the discharge door allowing opening of the discharge door.

3. A wagon as claimed in claim 1 wherein a sealing flap is provided along a free edge of the cover, the sealing flap being sealingly engageable with an outer face of the opposite side wall when the cover is in the closed position.

4. A wagon as claimed in claim 1 wherein the cover locking means is of two part construction comprising a locking bolt and a complementary receiver, one part being mounted on the cover and the other part being mounted on a side wall of the body.

5. A wagon as claimed in claim 4 wherein the bolt is ram-operated for movement between an extended receiver-engaging locking position and a retracted released position.

6. A wagon as claimed in claim 1 wherein the ram means is mounted within the body on the side wall on which the cover is hingedly mounted, the ram means extending between an underside of the cover and an inside face of the side wall.

7. A wagon as claimed in claim 1 wherein the cover is pivotable through an angle of greater than 90° when moving between the closed position and the open position.

8. A wagon as claimed in claim 1 wherein the body has tapered sides which taper inwardly between a front end and a rear end of the body.

9. A wagon as claimed in claim 1 wherein a rear end of the base has a downwardly and outwardly sloping lip.

10. A wagon as claimed in claim 1 wherein at least portion of an interior surface of the body is covered with a protective lining.

11. A wagon as claimed in claim 10 wherein the protective lining is of plastics material.

12. A wagon as claimed in claim 1, wherein the discharge door locking means comprises a manual twist lock clamp mounted on each side of the discharge door.

13. A wagon as claimed in claim 1, wherein the discharge door locking means comprises a five point door locking clamp mounted at the bottom of the discharge door and having an associated actuating lever.

14. A wagon as claimed in claim 1, wherein the cover locking means comprises mechanical locking means.

15. A wagon as claimed in claim 14, wherein the mechanical locking means comprises mechanical screw locks for engagement between the side walls and the cover.

16. A wagon as claimed in claim 1, wherein the rear discharge door is supported in an inclined position, when closed.

17. A wagon as claimed in claim 1, further comprising alarm means to prevent a driver driving away the wagon when the cover is in the open position.

* * * * *